(12) United States Patent
Haman

(10) Patent No.: US 8,667,875 B2
(45) Date of Patent: Mar. 11, 2014

(54) ACCESSORY RETENTION DEVICE FOR A ROTARY IMPACT TOOL

(75) Inventor: Brian Haman, Cary, IL (US)

(73) Assignee: Robert Bosch GmbH, Stuttgart, DE (US)

( * ) Notice: Subject to any disclaimer, the term of this patent is extended or adjusted under 35 U.S.C. 154(b) by 109 days.

(21) Appl. No.: 13/118,845

(22) Filed: May 31, 2011

(65) Prior Publication Data

US 2012/0304836 A1    Dec. 6, 2012

(51) Int. Cl.
*B25B 21/02* (2006.01)
*B25B 23/00* (2006.01)

(52) U.S. Cl.
USPC .............................. 81/463; 403/328; 279/76

(58) Field of Classification Search
USPC ............... 81/466, 463, 177.85; 403/316, 324, 403/325, 328; 279/24, 28, 29, 76, 79, 97
See application file for complete search history.

(56) References Cited

U.S. PATENT DOCUMENTS

| | | | |
|---|---|---|---|
| 1,533,619 A | | 4/1925 | Thompson |
| 2,190,081 A | | 2/1940 | Pfauser |
| 2,675,257 A | | 4/1954 | Specht |
| 2,721,090 A | | 10/1955 | Kaman |
| 4,508,005 A | * | 4/1985 | Herman et al. ............ 81/177.85 |
| 4,794,828 A | * | 1/1989 | Olson ........................ 81/177.85 |
| 5,255,993 A | * | 10/1993 | Kovacs ......................... 403/328 |
| 5,442,980 A | * | 8/1995 | Ringer ....................... 81/177.85 |
| 6,398,445 B1 | * | 6/2002 | Matali Badia ............. 403/109.6 |
| 6,672,183 B2 | | 1/2004 | Johnson |
| 7,036,406 B2 | | 5/2006 | Milbourne et al. |
| 8,074,732 B2 | * | 12/2011 | Lehnert et al. .................. 173/93 |
| 8,424,879 B2 | * | 4/2013 | Reinauer ......................... 279/30 |
| 2010/0147117 A1 | * | 6/2010 | Hsieh ........................ 81/177.85 |
| 2010/0326249 A1 | * | 12/2010 | Super ........................ 81/177.85 |

FOREIGN PATENT DOCUMENTS

| | | |
|---|---|---|
| EP | 1666207 A2 | 6/2006 |
| JP | 4438942 | 3/2010 |
| WO | 9604108 A1 | 2/1996 |
| WO | 0170465 | 9/2001 |

OTHER PUBLICATIONS

International Search Report and Written Opinion in corresponding PCT Application (i.e., PCT/US2012/039608), completed Sep. 17, 2012 (12 pages).

* cited by examiner

*Primary Examiner* — David B Thomas
(74) *Attorney, Agent, or Firm* — Maginot, Moore & Beck

(57) ABSTRACT

A power tool assembly includes an anvil having an accessory receiving end portion that defines a detent bore. A detent is positioned in the detent bore and movable between a retracted position and an extended position in the detent bore. A biasing member is configured to urge the detent toward the extended position. The detent includes an upper detent portion having a trailing abutment surface, a trailing top surface portion, and a leading top surface portion. When the detent is positioned in the extended position, the trailing abutment surface and the trailing top surface portion are located outside of the detent bore, and the leading top surface portion is located within the detent bore. When the detent is positioned in the retracted position, the trailing abutment surface is located within the detent bore, and the leading top surface portion is located within the detent bore.

12 Claims, 7 Drawing Sheets

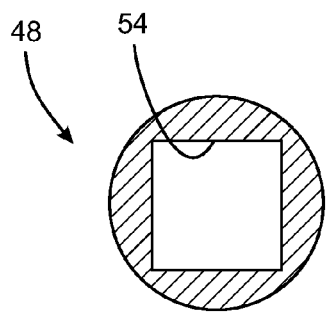
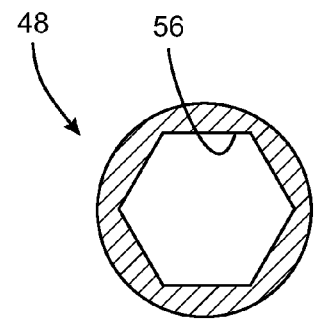
FIG. 7  FIG. 8
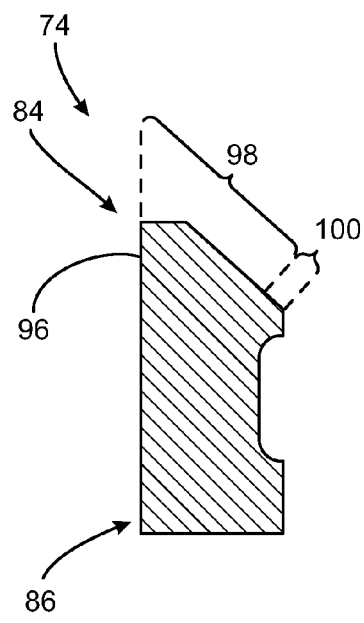
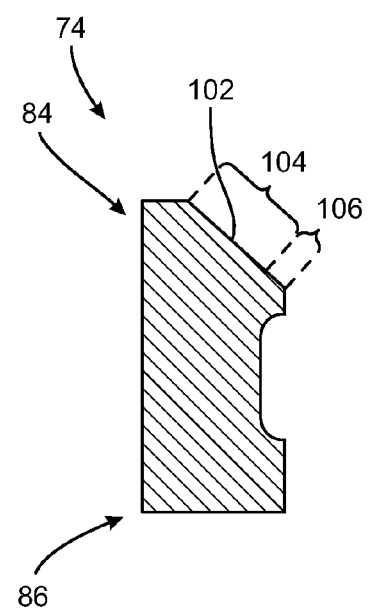
FIG. 11A  FIG. 11B

ACCESSORY RETENTION DEVICE FOR A ROTARY IMPACT TOOL

TECHNICAL FIELD

The present disclosure relates generally to rotary impact tools, and particularly to accessory retention devices for rotary impact tools.

BACKGROUND

In general, rotary impact tools, such as impact wrenches, are power tools that drive socket accessories to apply torque to lug nuts, bolt heads, and similar types of fasteners. These tools typically comprise a housing that encloses a motor, an impact mechanism, and an anvil. The anvil is rotatably supported in the housing. The motor drives the impact mechanism to deliver repeated impacts to the anvil which causes the anvil to rotate. The anvil includes an external drive surface that is received in the bore of a socket accessory tool. The drive surface and the bore typically have complementary polygonal shapes that enable the socket accessory tool to be driven to rotate with the anvil.

Impact tools are equipped with an accessory retention device for releasably retaining socket accessory tools to the external drive surface of the anvil. Spring-loaded ball detents are one example of a retention device known in the art. The ball detent protrudes from a detent bore defined in the drive portion of the anvil. When a socket accessory tool is installed on the drive portion of the anvil, the ball detent protrudes into a recess defined in the socket accessory tool to hold the socket accessory tool in place. The socket accessory tool compresses the ball detent into the detent bore during installation and removal. Therefore, ball detent retention devices typically do not require deliberate action by the user of the impact tool to install or remove a socket accessory tool.

In certain circumstances, however, it is important that the socket accessory tool be fully secured onto the tool such that it cannot be removed without a deliberate action by the user. In these cases, a pin detent retention device is often used. Similar to the ball detent, the pin detent is positioned in a detent bore defined in the drive portion of the anvil and protrudes from the detent bore into a complementarily positioned through-hole, or passage, defined in a socket accessory tool. The pin detent provides a positive stop or barrier that prevents the removal of the socket accessory tool. Pin detent retention devices typically require the use of a tool, such as a thin rod or pin, to enable the removal the socket accessory tool. The pin or rod is inserted into the passage and is used to press the pin detent down into the bore so the socket accessory tool can be removed.

Previously known pin detent retention devices, however, require deliberate action by the user to press the pin detent into the bore to enable installation of a socket accessory tool as well. In some cases, socket accessory tools may bottom out on the pin detent when installed on the anvil thereby subjecting the pin detent to shear loading. Shear loading can shorten the useful life of the pin detent.

What is needed is a retention device for releasably securing a socket accessory tool to the anvil of an impact tool that allows socket accessory tools to be easily installed while still requiring deliberate action by the user to remove the socket accessory tool. Also, what is needed is a socket retention device that can accommodate different socket designs without being susceptible to the damaging effects of shear load on the retention device from the sockets themselves.

SUMMARY

In accordance with one embodiment of the present disclosure, a power tool assembly comprises a housing defining a housing opening. An anvil is rotatably supported in the housing. The anvil extends through the housing opening and includes an accessory receiving end portion. The accessory receiving end portion includes an interior sidewall structure and an interior end wall structure that collectively defines a detent bore. A detent is positioned in the detent bore and movable between a retracted position and an extended position in the detent bore. A biasing member is interposed between the detent and the interior end wall that is configured to urge the detent toward the extended position. The detent includes an upper detent portion having (i) a trailing abutment surface, (ii) a trailing top surface portion, and (iii) a leading top surface portion. When the detent is positioned in the extended position, (i) the trailing abutment surface and the trailing top surface portion are located outside of the detent bore, and (ii) the leading top surface portion is located within the detent bore. When the detent is positioned in the retracted position, (i) the trailing abutment surface is located within the detent bore, and (ii) the leading top surface portion is located within the detent bore.

BRIEF DESCRIPTION OF THE DRAWINGS

FIG. 7 is a cross-sectional view of the socket accessory tool of FIG. 6 taken along lines B-B.

FIG. 8 is a cross-sectional view of the socket accessory tool of FIG. 6 taken along lines C-C.

FIG. 11A is a cross-sectional view of the pin detent of the accessory retention device indicating the arrangement of the trailing surface and top surface of the upper detent portion of the pin detent.

FIG. 11B is a cross-sectional view of the pin detent of the accessory retention device indicating the tapered surface segment of the upper detent portion of the pin detent.

DETAILED DESCRIPTION

Figure 1:
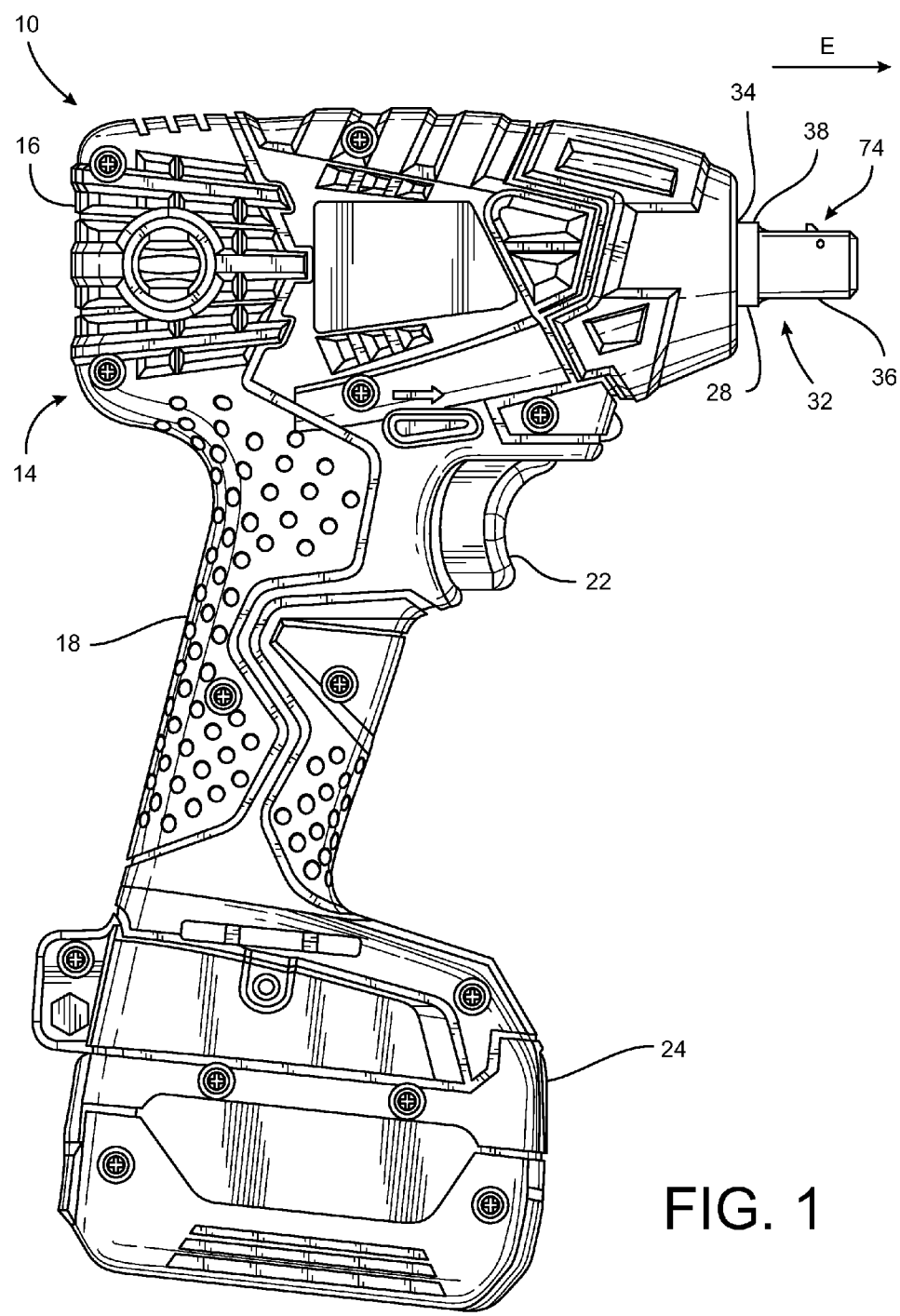
FIG. 1 is a side elevational view of a rotary impact tool that includes an accessory retention device according to the present disclosure.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Figure 5:
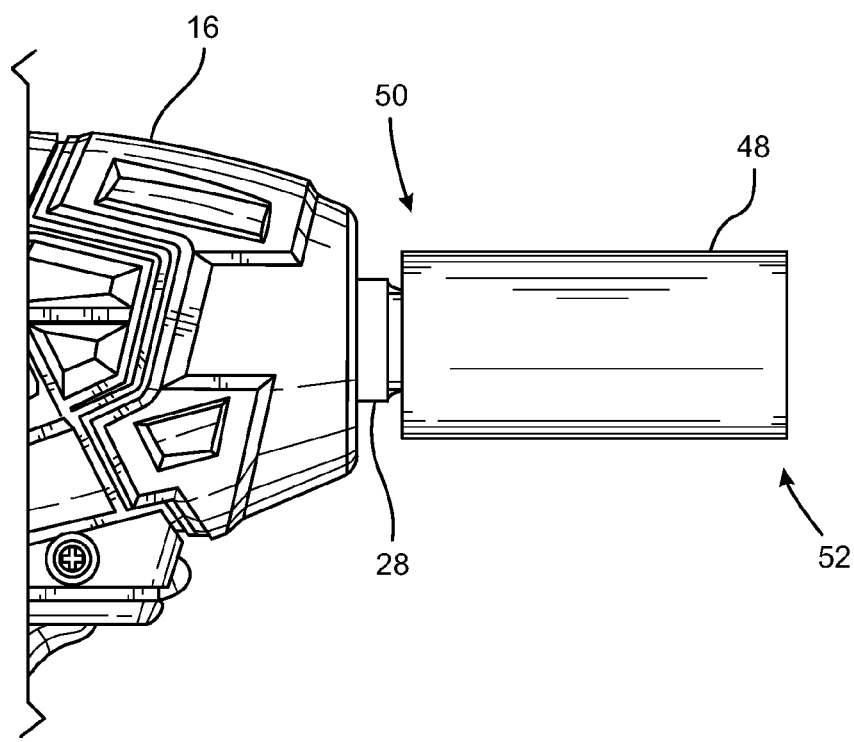
FIG. 5 is a fragmentary view of the rotary impact tool of FIG. 1 with a socket accessory tool installed on the drive end portion of the anvil.

FIG. 1 depicts a rotary impact tool assembly 10 in the form of an impact wrench. The rotary impact tool assembly 10, or impact tool, includes an anvil 28 having a drive surface that is inserted into a complementarily configured bore segment of a socket accessory tool 48 (FIG. 5). In accordance with the present disclosure, the impact tool 10 includes a retaining member in the form of a pin detent 74 that is movable into a passage defined in the socket accessory tool 48 to couple the socket accessory tool 48 to the anvil 28. As explained below, the pin detent 74 has a configuration that enables the socket accessory tool 48 to be quickly and easily installed on the anvil 28 while requiring deliberate action by the user to remove the socket accessory tool 48 from the anvil 28. In addition, the configuration of the pin detent 74 minimizes the amount of shear loading experienced by the pin detent 74 during use resulting in less wear and a longer pin life.

Figure 2:
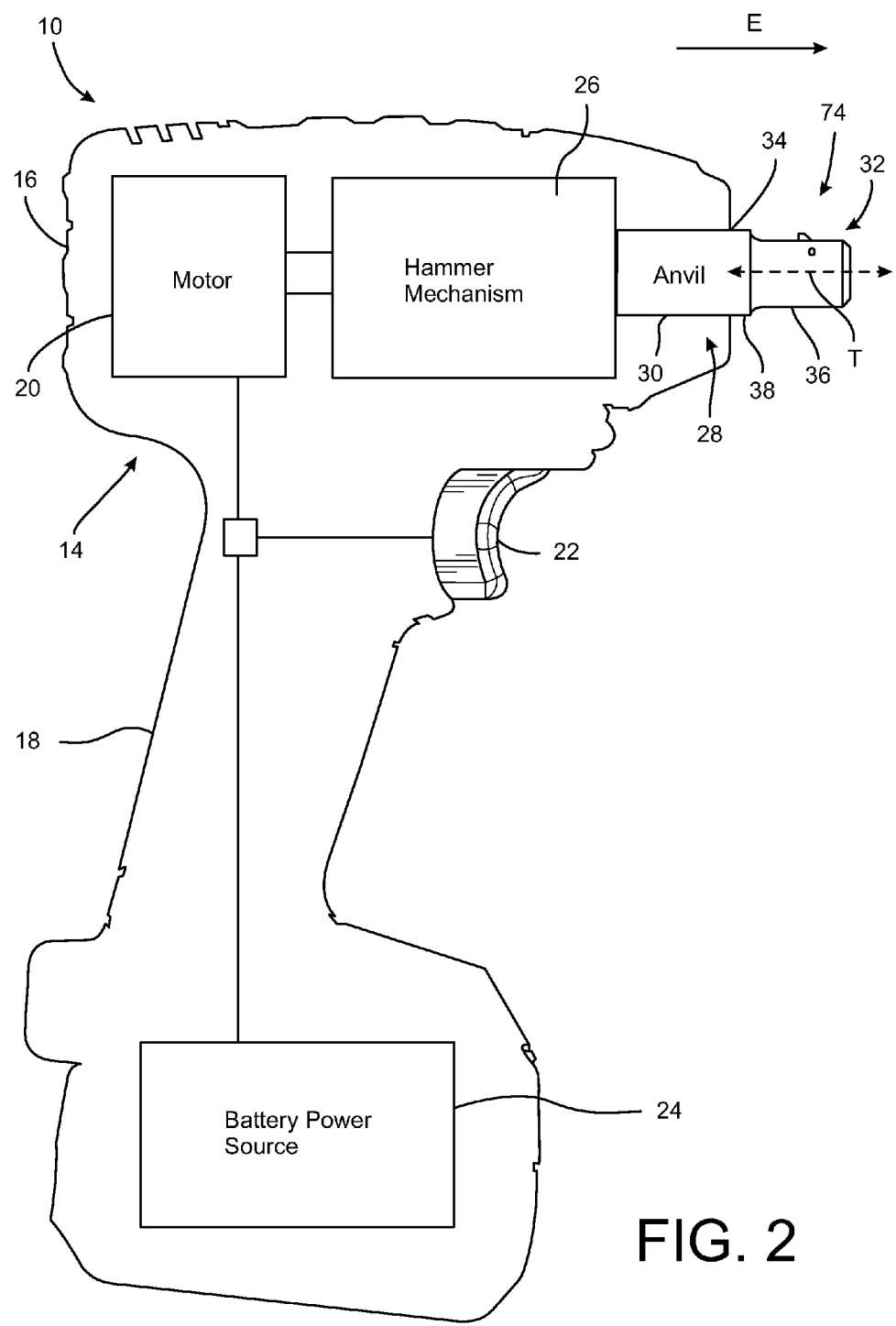
FIG. 2 is a schematic view of the rotary impact tool of FIG. 1 showing the internal components of the rotary impact tool.
Figure 3:
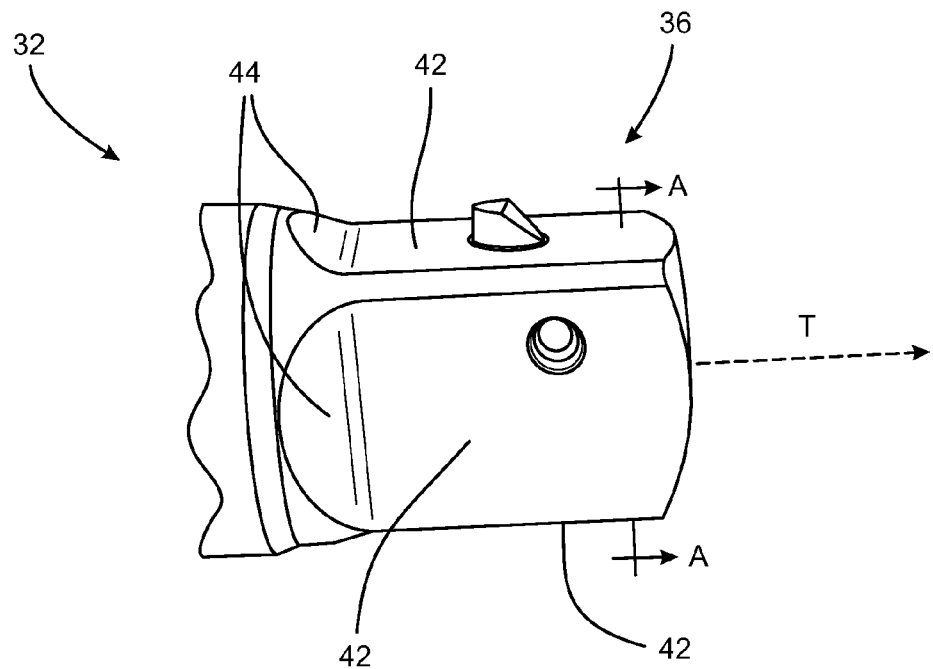
FIG. 3 is a perspective view of the drive end portion of the anvil of the rotary impact tool of FIG. 1.

As depicted, the impact tool 10 includes a housing 14 constructed of a rigid material such as plastic, metal, or composite materials such as a fiber-reinforced polymer. The housing 14 includes a drive section 16 and a handle 18. As shown schematically in FIG. 2, the drive section 16 of the housing 14 encloses a motor 20, a hammer mechanism 26, and an anvil 28. In one embodiment, the motor 20 comprises an electric motor configured to receive power from a rechargeable battery 24 connected at the base of the handle 18. In other embodiments, electric power for the motor 20 may be received from an AC outlet via a power cord (not shown). As an alternative to electric power, the impact wrench may be pneumatically or hydraulically powered.

The anvil 28 of the impact tool 10 includes an internal main body portion 30 and an external drive portion 32. The internal body portion 30 is rotatably supported in the drive section 16 of the housing 14 for rotation about a tool axis T. The external drive portion 32 of the anvil 28 extends to the exterior of the housing 14 through an opening 34 defined in the drive section 16 of the housing 14. A hammer mechanism 26 is operably supported in the drive section 16 for movement into and out of contact with the main body of the anvil 28. The motor 20 is configured to drive the hammer mechanism 26 to repeatedly contact, or impact, the body portion 30 of the anvil 28. The handle 18 of the housing 14 includes a trigger 22 configured to selectively connect the motor 20 to the power source thereby enabling selective rotation of the anvil 28 during operation. The impacts rotate the body portion 30 and the external drive portion 32 of the anvil 28 about the tool axis T and enable the external drive portion 32 to generate a relatively high amount of torque for turning fasteners, such as lug nuts, bolt heads, and the like.

The external drive portion 32 of the anvil 28 is adapted to receive and retain accessory tools, such as sockets, drive adaptors, and other types of rotationally driven accessories. The external drive portion 32 includes an accessory receiving end portion 36 and a transition portion 38. The accessory receiving end portion 36, also referred to as the drive end portion, is arranged at the lead end portion of the anvil 28. As used herein, the terms "leading" and "trailing" are used to refer to parts or portions of the impact tool 10 as they relate to a direction of extension E of the drive end portion 36 from the main body portion 30 of the anvil 28. In particular, the term "leading" is used to refer to relative positions that are positioned farthest in the direction of extension E. The term "trailing" is used to refer to relative positions that are the farthest in a direction that is opposite of the direction of extension E.

Figure 6:
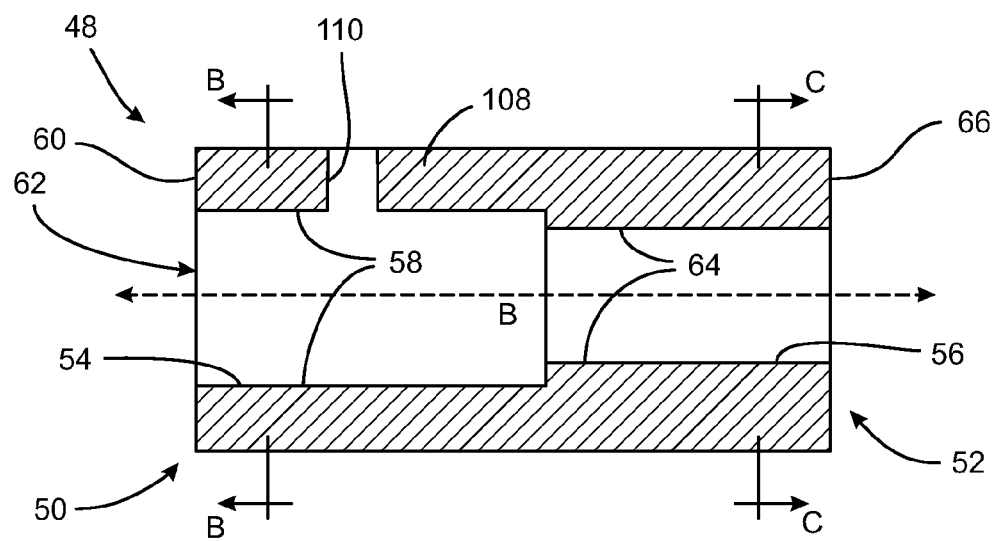
FIG. 6 is a cross-sectional view of the socket accessory tool shown in FIG. 5.

Referring to FIGS. 5 and 6, the drive end portion 36 includes a plurality of exterior sidewalls 42 arranged generally parallel to the tool axis T. The exterior sidewalls 42 collectively define an external drive surface 40 having a generally polygonal shape. In the exemplary embodiment described herein, the exterior sidewalls 42 define a generally square-shaped external drive surface 40 as depicted in FIG. 6. The square-shaped external drive surface 40 has a predetermined width W that defines the drive size of the impact wrench. Examples of drive sizes for the external drive surface 40 include ¼", ⅜", ½", and ¾" drives.

Figure 12:
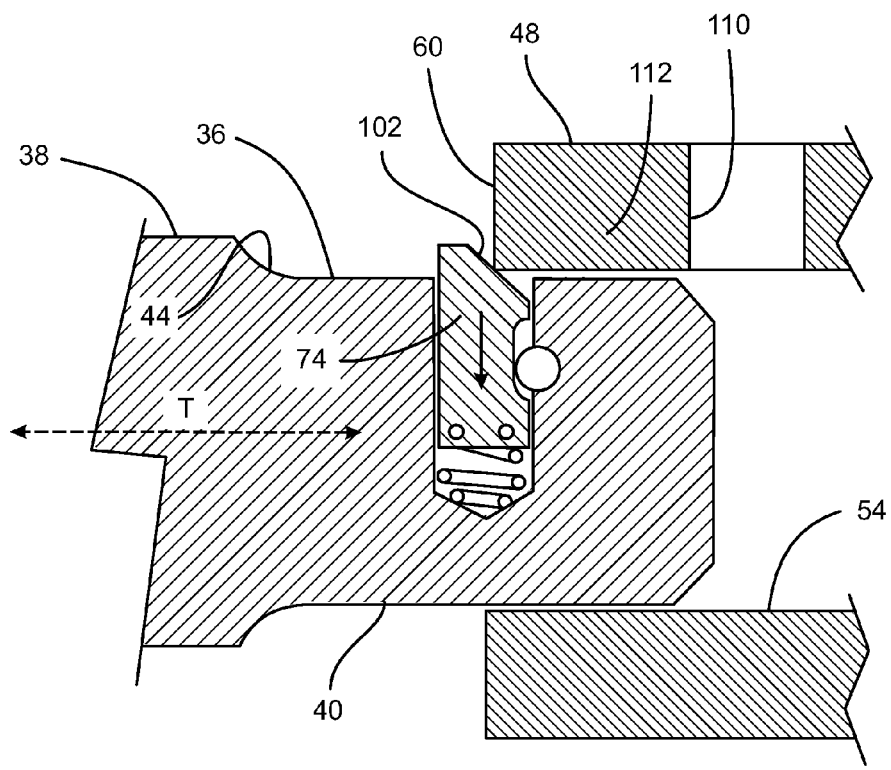
FIG. 12 is a cross-sectional view of the drive end portion of FIG. 3 showing the detent of the accessory retention device being contacted by a socket accessory tool.

The transition portion 38 of the anvil 28 is arranged between the main body portion 30 and the drive end portion 36 of the anvil 28. The main body portion 30 of the anvil 28 has a generally cylindrical-shaped external surface with a diameter that is greater than the width of the external drive surface 40. The transition portion 38 defines the change in shape from the cylindrical external shape of the main body portion 30 to the polygonal-shaped external drive surface 40. In the embodiment of FIG. 12, the transition portion 38 includes a tapered external wall segment 44 that defines the transition from the cylindrical-shaped main body portion 30 to the narrower square-shaped external drive surface 40 of the drive end portion 36. In alternative embodiments, the transition portion may comprise a wall segment arranged generally perpendicular to the tool axis T that extends between the cylindrical exterior surface of the anvil and the polygonal drive surface.

FIGS. 5 and 6 depict an exemplary embodiment of a socket accessory tool 48 for the impact tool of FIG. 1. As depicted, the socket accessory tool 48 includes a drive receiving end portion 50 and a fastener receiving end portion 52 that collectively define a bore structure 54, 56 centered on a bore axis B. The drive receiving end portion 50 includes a first plurality of internal walls 58 arranged generally parallel to the bore axis B and a trailing end wall 60 arranged perpendicular to the bore axis B. The first plurality of internal walls 58 defines a first bore segment 54 in which the drive end portion 36 of the anvil 28 is received. The trailing end wall 60 defines a first opening 62 that leads to the first bore segment 54.

Figure 4:
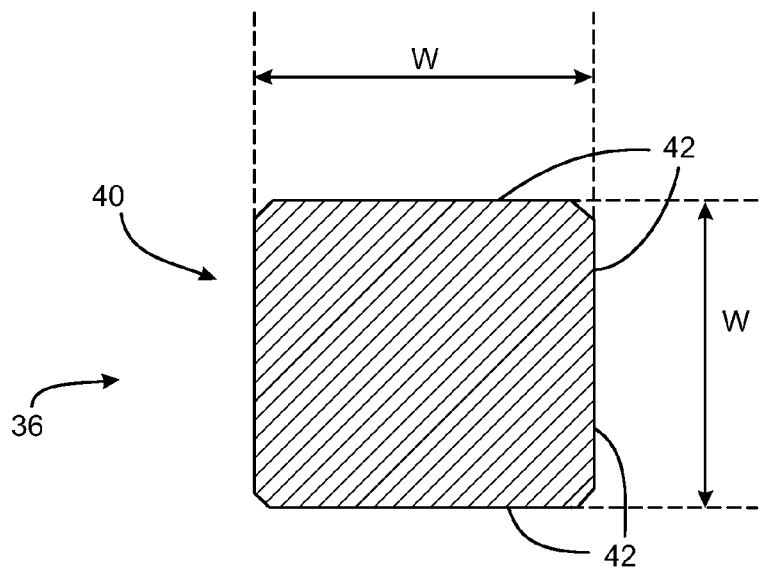
FIG. 4 is a cross-sectional view of the drive end portion of FIG. 3 taken along lines A-A.

As depicted in FIG. 7, the first bore segment 54 has a generally polygonal shape. The polygonal shape of the first bore segment 54 complements the polygonal shape of the external drive surface 40. In the embodiment of FIG. 4, the first bore segment 54 has a generally rectangular or square shape for receiving the square-shaped external drive surface 40 of the drive end portion 36.

The fastener receiving portion 52 of the socket accessory tool 48 includes a second plurality of internal walls 64 and a leading end wall 66. The second plurality of internal walls 64 defines a second bore segment 56, and the leading end wall 66 defines a second opening 68 that leads to the second bore segment 56. As depicted in FIG. 8, the second bore segment 56 has a generally polygonal cross-sectional shape in a plane perpendicular to the bore axis B for mating with a fastener structure (not shown) having a drive portion with a complementary size and shape. As depicted in FIG. 8, the second bore segment 56 may have a hexagonal cross-sectional shape for mating with correspondingly sized and shaped bolt heads, nuts, lugs, and the like.

The socket accessory tool 48 is installed on the impact tool 10 by aligning the bore axis B with the tool axis T and moving first bore segment 54 and the external drive surface 40 axially toward each other until the external drive surface 40 is positioned within the first bore segment 54. The complementary shapes of the external drive surface 40 and the first bore segment 54 substantially prevent rotational movement of the socket accessory tool 48 with respect to the external drive surface 40 about the tool axis T.

Figure 9:
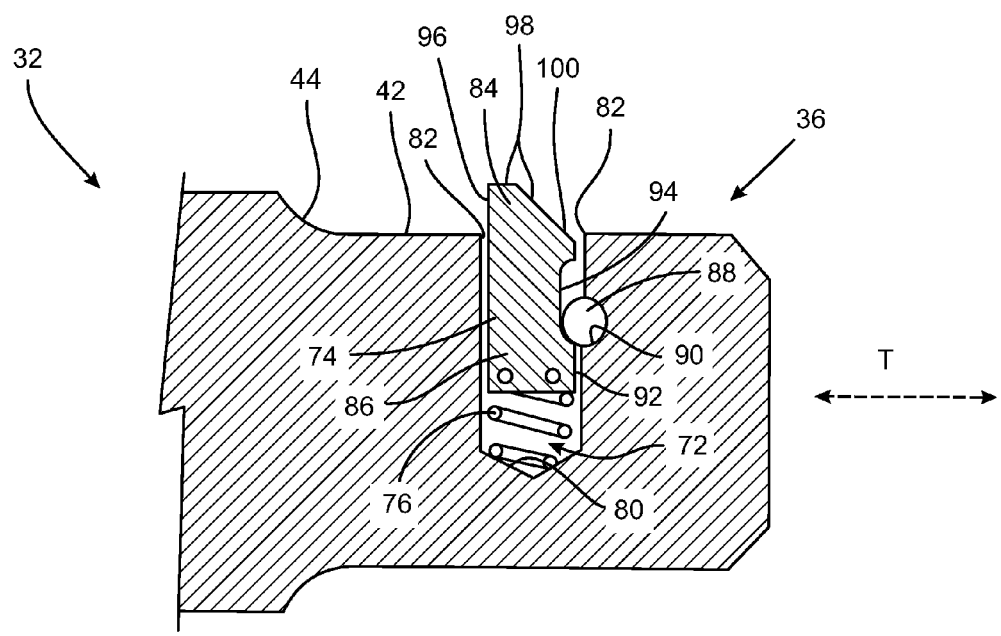
FIG. 9 is a cross-sectional view of the drive end portion of FIG. 3 showing the detent of the accessory retention device in an extended position.
Figure 10:
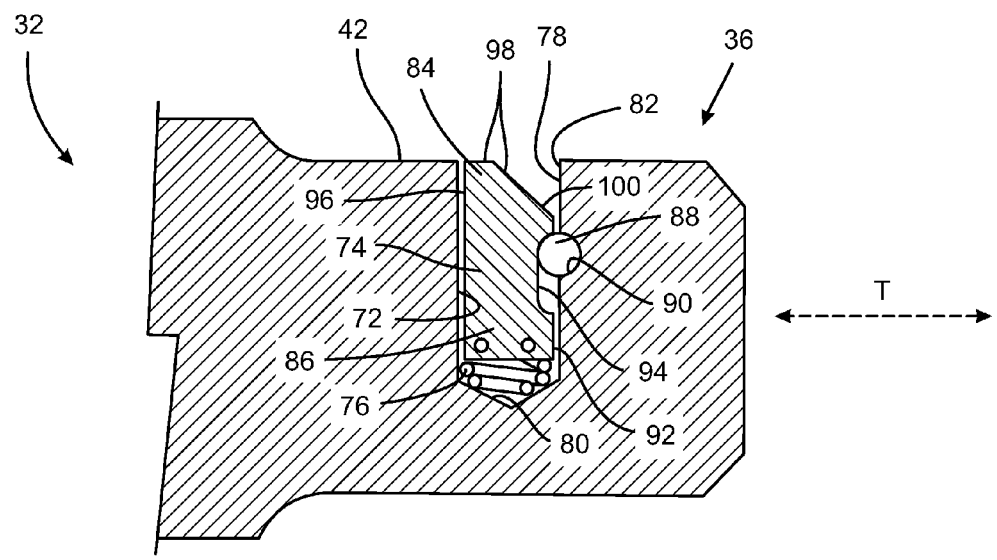
FIG. 10 is a cross-sectional view of the drive end portion of FIG. 3 showing the detent of the accessory retention device in a retracted position.

The impact tool 10 includes an accessory retention mechanism for preventing unwanted axial movement of the socket accessory tool 48 with respect to the external drive surface 40. Referring to FIGS. 9 and 10, the accessory retaining mechanism comprises a detent bore 72, a detent 74, and a biasing member 76. In the embodiment of FIGS. 9 and 10, the drive end portion 36 includes an interior sidewall structure 78 and an interior end wall structure 80 that collectively define the detent bore 72. The interior sidewall structure 78 has a generally cylindrical shape and is arranged substantially perpendicular to the tool axis T. One of the plurality of exterior sidewalls 42 defines an access opening 82 that leads to the detent bore 72. The interior end wall 80 is located a predetermined distance beneath the access opening 82 defined in the external drive surface 40.

The detent 74 comprises a pin that is slideably received in the detent bore 72. The pin detent 74 has a generally cylindrically-shaped body including an upper detent portion 84 and a lower detent portion 86. The upper detent portion 84 is oriented toward the access opening 82 defined in the external drive surface 40, and the lower detent portion 86 is oriented toward the interior end wall structure 80 of the detent bore 72. The pin detent 74 is movable in the detent bore 72 between a retracted position (FIG. 10) and an extended position (FIG. 9). A biasing member 76 is utilized to bias the pin detent 74 toward its extended position. In the embodiment of FIGS. 9 and 10, the biasing member 76 comprises a coil spring inserted into the detent bore 72 between the internal end wall structure 80 of the bore and lower detent portion 86 of the pin detent 74.

The impact tool 10 includes a blocking structure 88 that retains the pin detent 74 in the detent bore 72 and serves as a travel limiter for limiting movement of the pin detent 74 in the detent bore 72 beyond the retracted position and the extended position. In one embodiment, the blocking structure 88 comprises a pin or rod positioned within a retention bore 90 defined in the drive end portion 36. The retention bore 90 communicates with or intersects the detent bore 72 so that the blocking structure 88 is at least partially positioned within the detent bore 72. In the embodiment of FIGS. 9 and 10, the retention bore 90 is arranged generally perpendicular to the detent bore 72 so that the blocking structure 88 intersects the detent bore 72 at substantially a right angle.

The pin detent 74 includes an outer surface 92 that defines a groove 94 for interacting with the blocking structure 88 in the detent bore 72. The blocking structure 88 is positioned within the groove 94 during movement between the retracted position and the extended position. The groove 94 has a predetermined length extending between the upper detent portion 84 and the lower detent portion 86. The length of the groove 94 in conjunction with the size and position of the blocking structure 88 in relation to the detent bore 72 define the retracted and extended positions for the pin detent 74.

Referring to FIG. 11A, the upper detent portion 84 includes a trailing abutment surface 96, a trailing top surface portion 98, and a leading top surface portion 100. When viewed in a cross sectional view along the tool axis T as depicted in FIGS. 9 and 10, the trailing top surface portion 98 lies contiguous with the trailing abutment surface 96, and the leading top surface portion 100 lies contiguous with the trailing top surface portion 98. As depicted in FIG. 10, when the pin detent 74 is positioned in the retracted position, the trailing abutment surface 96 and the leading top surface portion 100 are located within the detent bore 72, and the trailing top surface portion 98 is positioned approximately at the access opening to the detent bore 72. As depicted in FIG. 9, when the pin detent 74 is positioned in the extended position, the trailing abutment surface 96 and the trailing top surface portion 98 are located outside of the detent bore 72, and the leading top surface portion 100 is located within the detent bore 72.

The trailing top surface portion 98 and the leading top surface portion 100 are at least partially defined by a slanted or tapered top surface segment 102 as depicted in FIG. 11B. In one embodiment, the tapered top surface segment 102 comprises a chamfer. In the exemplary embodiment, the chamfer extends between the front face of the pin detent (i.e., the portion of the pin facing away from the housing 14) and the radially outer end of the pin detent leaving a flat surface portion extending between the chamfered surface 102 and the trailing surface 96 of the pin detent. In alternative embodiments, the chamfer may extend all the way to the trailing surface 96 so that substantially the entire top surface of the pin comprises a chamfer.

The chamfer 102 is arranged at a predetermined angle with respect to the tool axis T. The angle of the chamfer enables the force that is applied to the chamfer along the tool axis T to be translated to a force that moves the detent axially into the bore toward the retracted position. The predetermined angle of the chamfer 102 may be any angle that enables the pin detent to be compressed axially into the bore when the chamfer is contacted by a socket accessory tool being installed axially onto the anvil. The tapered, or chamfered, surface segment 102 includes a trailing surface part 104 and a leading surface part 106 that are contiguous with each other. The leading top surface portion 100 includes the leading surface part 106 of the tapered surface segment 102, and the trailing top surface portion 98 includes the trailing surface part 104 of the tapered surface segment 102. The leading surface part 106 of the tapered surface segment 102 is located within the bore 72 and the trailing surface part 104 of the tapered surface segment 102 is located outside of the detent bore 72 when the pin detent 74 is in its extended position.

The angle of the chamfer 102 in conjunction with the location of the leading surface part 106 of the chamfer within the bore ensures that the chamfer 102 is the first portion of the pin detent contacted by the socket accessory tool when the socket accessory tool is installed on the anvil. The socket accessory tool may therefore be used to compress the pin detent axially into the bore as the socket accessory tool is installed on the anvil. As a result, the chamfer eliminates the need to manually compress the pin detent with a tool, such as a rod, to allow a socket accessory tool to be mounted onto the anvil.

Referring again to FIG. 6, the socket accessory tool 48 includes a wall structure 108 that defines an open-ended hole or passage 110, referred to herein as an actuator passage, for receiving the pin detent 74 when the pin detent 74 is in its extended position. The actuator passage 110 communicates with the first generally polygonal-shaped bore segment 54 of the socket accessory tool 48. The actuator passage 110 has a generally cylindrical shape with a diameter that is slightly larger than the diameter of the pin detent 74.

The socket accessory tool 48 is installed onto the anvil 28 by sliding the external drive surface 40 of the anvil 28 into the first bore segment 54 of the socket accessory tool 48. As depicted in FIG. 12, the tapered or chamfered surface segment 102 is the first portion of the pin detent 74 contacted by a portion of the socket accessory tool 48 during installation of the socket accessory tool 48. The tapered or chamfered surface segment 102 is angled with respect to the tool axis T resulting in the pin detent 74 compressing axially toward its retracted position when contacted by the socket accessory tool 48, thus allowing the socket 48 to easily slide onto the anvil 28 without a significant amount of force or requiring a separate tool.

Figure 13:
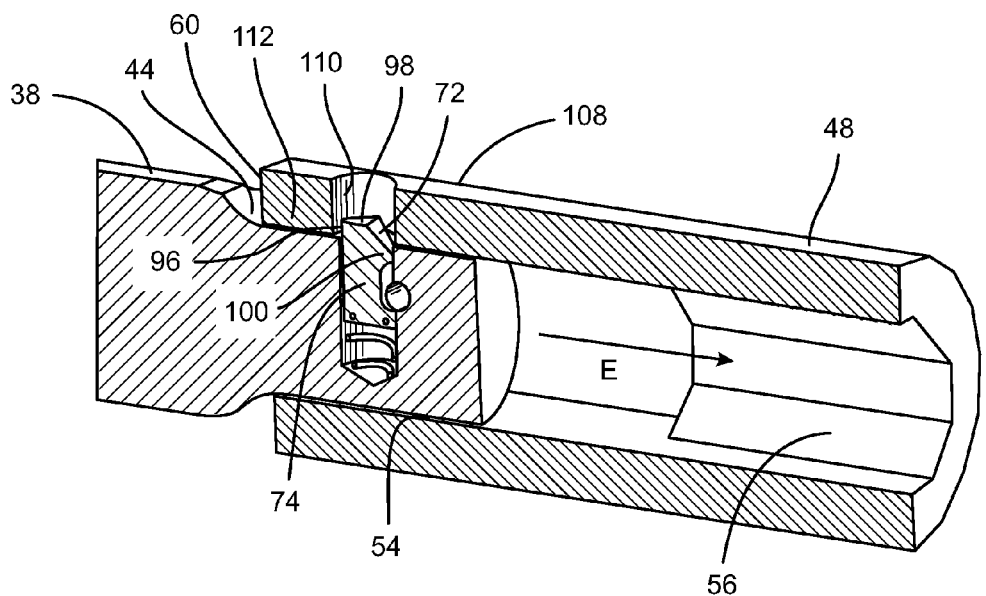
FIG. 13 is a perspective cross-sectional view of the drive end portion of FIG. 3 showing the socket accessory tool of FIG. 6 retained by the accessory retention device.

The pin detent 74 is compressed into its retracted position as the socket accessory tool 48 slides along the external drive surface 40 until the actuator passage 110 of the socket accessory tool 48 is aligned with the detent bore 72, as depicted in FIG. 13. The actuator passage 110 provides clearance for the pin detent 74 to be biased into its extended position by the biasing member 76. When the pin detent 74 is in the extended position, the trailing abutment surface 96 and the trailing top surface portion 98 are located within the actuator passage. The leading top surface portion 100 remains within the detent bore 72 located outside of the actuator passage 110.

The wall structure 108 of the socket accessory tool 48 includes a retention portion 112 that is interposed between the actuator passage 110 and the trailing end wall 60. When the pin detent 74 is positioned in the extended position as depicted in FIG. 13, the retention portion 112 of the socket accessory tool 48 is interposed between the trailing abutment surface 96 and the tapered external anvil wall segment 44. The trailing abutment surface 96 of the pin detent 74 blocks movement of the socket accessory tool 48 in the direction E, and the transition portion 38 of the anvil limits further movement of the socket accessory tool 48 toward the impact tool 10.

The chamfer 102 of the pin detent 74 also serves to prevent the socket accessory tool from bottoming out on the pin detent and being placed in shear when the socket accessory tool is installed on the anvil. For example, various socket accessory tools may have different designs resulting in different distances between the trailing end wall and the actuator passage of the socket accessory tool. In some cases, the distance between the trailing end wall and the actuator passage of a socket accessory tool may be less than the distance between the transition portion of the anvil and the pin detent. In this case, when an axial force is applied to the socket accessory tool toward the impact wrench 10, the interior wall of the actuator passage 110 contacts the chamfer 102 and compresses the pin detent into the bore thereby allowing the socket accessory tool to move toward the impact tool and bottom out on the transition portion 38.

The engagement between the trailing abutment surface 96 and the actuator passage 110 results in a secure retention of the socket accessory tool 48 to the anvil 28. A deliberate action of the user of the impact tool 10 is required to remove the socket accessory tool 48 from the anvil 28 once installed. For example, the socket accessory tool 48 can be removed from the anvil 28 by inserting a narrow pin or rod into the actuator passage and pressing the pin detent 74 into its retracted position within the detent bore 72. With the pin detent 74 positioned within the detent bore 72, the socket accessory tool 48 can be pulled from the anvil 28.

The configuration of the pin detent 74 described herein enables a relatively quick and easy installation of a socket accessory tool 48 to the anvil 28 of an impact tool while also providing a secure retention method to prevent accidental or inadvertent removal of the accessory tool once installed.

Another benefit of this design for a pin detent 74 is longer pin life due to reduced shear loading. For example, the tapered or chamfered surface on the leading face of the pin allows the socket to compress the pin detent 74 into the detent bore 72 and bottom out on the anvil rather than bottoming out on the pin and placing the pin in shear loading. This situation can be experienced with certain socket designs as well as in cases of extensive socket accessory wear.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A power tool assembly, comprising:
   a housing defining a housing opening;
   an anvil rotatably supported in said housing, said anvil including a drive portion extending through said housing opening, said drive portion including a transition portion and an accessory receiving end portion, the transition portion being wider than the accessory receiving end portion, the accessory receiving end portion extending from the transition portion and having an interior sidewall structure and an interior end wall that collectively defines a detent bore;
   a detent positioned in said detent bore and movable between a retracted position and an extended position; and
   a biasing member positioned in said detent bore between said detent and said interior end wall and configured to urge said detent toward said extended position;
   wherein said detent includes an upper detent portion having (i) a trailing abutment surface, (ii) a trailing top surface portion, and (iii) a leading top surface portion;
   wherein, when said detent is positioned in said extended position, (i) said trailing abutment surface and said trailing top surface portion are located outside of said detent bore, and (ii) said leading top surface portion is located within said detent bore;
   wherein, when said detent is positioned in said retracted position, (i) said trailing abutment surface is located within said detent bore, and (ii) said leading top surface portion is located within said detent bore;
   wherein the detent in is configured to be received in an actuator passage defined by an interior wall of a socket installed on the accessory receiving end portion;
   wherein the detent pin is configured to be contacted by and compressed into the detent bore by the interior wall of the actuator passage in response to an axial load on the socket; and
   wherein the detent bore and the transition portion are positioned with respect to each other such that the transition portion provides an axial stop for the socket when the detent pin is compressed into detent bore by the interior wall of the actuator passage.

2. The power tool of claim 1, wherein:
   said accessory receiving end portion defines an access opening leading to said detent bore, and
   when said detent is positioned in said retracted position, said trailing top surface portion is positioned approximately at said access opening.

3. The power tool of claim 1, further comprising an accessory including:

a first end portion having a first generally polygonal-shaped bore segment in which said accessory receiving end portion of said anvil is received, and a second end portion having a second generally polygonal-shaped bore segment.

4. The power tool of claim 3, wherein:

said first end portion of said accessory includes a first plurality of internal walls that define said first generally polygonal-shaped bore segment, and said second end portion of said accessory includes a second plurality of internal walls that define said second generally polygonal-shaped bore segment.

5. The power tool of claim 3, wherein:

said actuator passage communicates with said first generally polygonal-shaped bore segment, and when said detent is positioned in said extended position, (i) said trailing abutment surface and said trailing top surface portion are located within said actuator passage, and (ii) said leading top surface portion is located outside of said actuator passage, and when said detent is positioned in said retracted position, each of said trailing abutment surface, said trailing top surface portion, and said leading top surface portion is located outside of said actuator passage.

6. The power tool of claim 5, wherein said accessory includes (i) a trailing end wall defining a first opening leading to said first generally polygonal-shaped bore segment, and (ii) a leading end wall defining a second opening leading to said second polygonal-shaped bore segment, said wall structure includes a retention portion interposed between said actuator passage and said trailing end wall, and when said detent is positioned in said extended position, (i) said retention portion is interposed between said trailing abutment surface and said transition portion.

7. The power tool of claim 3, wherein:

said accessory receiving end portion includes a polygonal-shaped external drive surface, and said polygonal-shaped external drive surface is positioned within said first generally polygonal-shaped bore segment of said first end portion of said accessory.

8. The power tool of claim 3, wherein:

said first generally polygonal-shaped bore segment is substantially rectangularly-shaped, and said second generally polygonal-shaped bore segment is substantially hexagonally-shaped.

9. The power tool of claim 1, wherein:

said anvil is configured to rotate about an axis, and when said power tool assembly is viewed in a cross sectional view along said axis, (i) said trailing abutment surface lies contiguous with said trailing top surface portion, and (ii) said trailing top surface portion lies contiguous with said leading top surface portion.

10. The power tool of claim 1, wherein said interior sidewall structure of said accessory receiving end portion is generally cylindrical shaped.

11. The power tool of claim 1, further comprising a blocking structure, wherein:

said anvil further defines a retention bore that communicates with said detent bore, and said blocking structure is positioned within said retention bore.

12. The power tool of claim 1, wherein:

said upper detent portion includes a tapered top surface segment, said tapered top surface segment includes a leading surface part and a trailing surface part that are contiguous with each other, said trailing top surface portion includes said trailing surface part, and said leading top surface portion includes said leading surface part.

* * * * *